US007440569B2

(12) United States Patent
Eisentraeger et al.

(10) Patent No.: US 7,440,569 B2
(45) Date of Patent: Oct. 21, 2008

(54) TATE PAIRING TECHNIQUES FOR USE WITH HYPERELLIPTIC CURVES

(75) Inventors: Anne Kirsten Eisentraeger, Pasadena, CA (US); Kristin E. Lauter, Redmond, WA (US); Peter L. Montgomery, San Rafael, CA (US)

(73) Assignee: Microsoft Corporation, Redmond, WA (US)

( * ) Notice: Subject to any disclaimer, the term of this patent is extended or adjusted under 35 U.S.C. 154(b) by 555 days.

(21) Appl. No.: 10/628,729

(22) Filed: Jul. 28, 2003

(65) Prior Publication Data

US 2005/0025311 A1    Feb. 3, 2005

(51) Int. Cl.
H04L 9/00    (2006.01)
(52) U.S. Cl. .......................... 380/28; 380/30; 380/258; 380/269; 713/151; 713/171; 713/176
(58) Field of Classification Search .................. 380/28, 380/30, 258, 269; 713/151, 171, 176
See application file for complete search history.

(56) References Cited

U.S. PATENT DOCUMENTS

| 5,272,755 | A  | * | 12/1993 | Miyaji et al. ................. 380/30 |
| 6,446,205 | B1 |   | 9/2002  | Lenstra |
| 6,968,354 | B2 | * | 11/2005 | Kaminaga et al. ........... 708/491 |
| 6,986,054 | B2 | * | 1/2006  | Kaminaga et al. ........... 713/193 |
| 7,079,650 | B1 | * | 7/2006  | Knudsen ....................... 380/30 |
| 2003/0072443 | A1 | * | 4/2003 | Harley et al. .................. 380/30 |
| 2003/0081785 | A1 | * | 5/2003 | Boneh et al. ................. 380/277 |
| 2003/0182554 | A1 |   | 9/2003 | Gentry et al. |
| 2004/0131191 | A1 | * | 7/2004 | Chen et al. ................... 380/282 |

OTHER PUBLICATIONS

Gerhard Frey, Michael Muller, and Hans-Georg Ruck; "The Tate Pairing and the Discrete Logarithm Applied to Elliptic Curve Cryptosystems" IEEE Transactions on Information Theory, vol. 45, No. 5, Jul. 1999, pp. 1717-1719.*
Neal Koblitz; "Overview of elliptic curve cryptography"; MSRI, Jan. 11, 1998; 34 Pages. "www.msri.org/publications/In/msri/1998/crypt/koblitz/1/index.html".□□*
"Public Key Cryptography"; IEEE Standard 1363-2000;IEEE 2000; pp. 117-131.*
Zhi Li et al; "Performance of Finite Field Arithmetic in an Elliptic Curve Cryptosystem"; IEEE 2001; pp. 249-256.*
Liqun Chen et al; "Identity Based Authenticated Key Agreement Protocols from Pairing"; Computer Security Foundations Workshop, 2003. Proceedings. 16th IEEE Jun. 30-Jul. 2, 2003 pp. 219-233.*

(Continued)

Primary Examiner—Carl Colin
(74) Attorney, Agent, or Firm—Lee & Hayes, PLLC

(57) ABSTRACT

Methods and apparati are provided for determining a "Squared Tate pairing" for hyperelliptic curves and using the results to support at least one cryptographic process. The improved techniques provide increased efficiency and an alternative method to the conventional method of implementing the Tate pairing for Jacobians of hyperelliptic curves. With the Squared Tate pairing for hyperelliptic curves, one may obtain a significant speed-up over a contemporary implementation of the Tate pairing for hyperelliptic curves. The Squared Tate pairing for hyperelliptic curves can be substituted for the Tate pairing for hyperelliptic curves in any applicable cryptographic application.

54 Claims, 4 Drawing Sheets

OTHER PUBLICATIONS

Frey, et al., "The Tate Pairing and the Discrete Logarithm Applied to Elliptic Curve Cryptosystems," IEEE Transactions on Information Theory, vol. 45, No. 5, Jul. 1999, pp. 1717-1719.

Manoharmayum, "On the Modularity of Certain GL2 (F7) Galois Representations," Mathematical Research Letters 8, pp. 703-712 (2001).

Boneh, et al., "Identity-Based Encryption from the Weil Pairing," Siam J. Comput., vol. 32, No. 3, pp. 586-615, 2003 Society for Industrial and Applied Mathematics.

Cantor, "Computing in the Jacobian of a Hyperelliptic Curve," Mathematics of Computation, vol. 48, No. 177, Jan. 1987, pp. 95-101.

Eisentrager, et al., "Fast Elliptic Curve Arithmetic and Improved Weil Pairing Evaluation," Topics in Cryptology, CT-RSA 2003, Marc Joye (Ed), pp. 343-354, LNCS 2612, Springer-Verlag, 2003.

Hess, Florian et al., "Two Topics in Hyperelliptic Cryptography," S. Vaudenay & A. Youssef (Eds.): SAC 2001, LNCS 2259, 2001, pp. 181-189.

Joux, "The Weil and Tate Pairings as Building Blocks for Public Key Cryptosystems (Survey),"C. Fieker and D.R. Kohel (eds.): ANTS 2002, LNCS 2369, pp. 20-32, 2002 (Springer-Verlag Berlin Heidelberg 2002).

Menezes, Alfred J., et al., "Reducing Elliptic Curve Logarithms to Logarithms in a Finite Field," (0018-9448/93 1993 IEEE, IEEE Transactions on Information . . . ), 8 pages.

Eisentrager, Kirsten et al., "Fast Elliptic Curve Arithmetic and Improved Weil Pairing Evaluation," Topics in Cryptology, CT-RSA 2003, Marc Joye (Ed), pp. 343-354, LNCS 2612, Springer-Verlag, 2003.

Boneh, Dan, et al., "Identity-Based Encryption from the Weil Pairing," Siam J. Comput., vol. 32, No. 3, pp. 586-615, 2003 Society for Industrial and Applied Mathematics.

Frey, Gerhard et al., "A Remark Concerning m-Divisibility and the Discrete Logarithm in the Divisor Class Group of Curves," Mathematics of Computation, vol. 62, No. 206, Apr. 1994, pp. 865-874.

Hess, Florian et al., "Two Topics in Hyperelliptic Cryptography," S. Vaudenay & A. Youssef (Eds.): SAC 2001, LNCS 2259, pp. 181-189, 2001.

Galbraith, Steven D. et al., "Implementing the Tate Pairing," Mathematics Dept., Royal Holloway, University of London, Egham, Surrey, UK & Hewlett-Packard Laboratories, Bristol, Filton Road, Stoke Gifford, Bristol, UK, pp. 1-14, undated.

Joux, Antoine, "The Weil and Tate Pairings as Building Blocks for Public Key Cryptosystems (Survey),"C. Fieker and D.R. Kohel (eds. ): ANTS 2002, LNCS 2369, pp. 20-32, 2002 (Springer-Verlag Berlin Heidelberg 2002).

\* cited by examiner

TATE PAIRING TECHNIQUES FOR USE WITH HYPERELLIPTIC CURVES

TECHNICAL FIELD

This invention relates to cryptography, and more particularly to methods and apparati that implement improved processing techniques for Tate pairings on hyperelliptic curves.

BACKGROUND

As computers have become increasingly commonplace in homes and businesses throughout the world, and such computers have become increasingly interconnected via networks (such as the Internet), security and authentication concerns have become increasingly important. One manner in which these concerns have been addressed is the use of a cryptographic technique involving a key-based cipher. Using a key-based cipher, sequences of intelligible data (typically referred to as plaintext) that collectively form a message are mathematically transformed, through an enciphering process, into seemingly unintelligible data (typically referred to as ciphertext). The enciphering can be reversed, allowing recipients of the ciphertext with the appropriate key to transform the ciphertext back to plaintext, while making it very difficult, if not nearly impossible, for those without the appropriate key to recover the plaintext.

Public-key cryptographic techniques are one type of key-based cipher. In public-key cryptography, each communicating party has a public/private key pair. The public key of each pair is made publicly available (or at least available to others who are intended to send encrypted communications), but the private key is kept secret. In order to communicate a plaintext message using encryption to a receiving party, an originating party encrypts the plaintext message into a ciphertext message using the public key of the receiving party and communicates the ciphertext message to the receiving party. Upon receipt of the ciphertext message, the receiving party decrypts the message using its secret private key, and thereby recovers the original plaintext message.

The RSA (Rivest-Shamir-Adleman) method is one well-known example of public/private key cryptology. To implement RSA, one generates two large prime numbers p and q and multiplies them together to get a large composite number N, which is made public. If the primes are properly chosen and large enough, it will be practically impossible (i.e., computationally infeasible) for someone who does not know p and q to determine them from knowing only N. However, in order to be secure, the size of N typically needs to be more than 1,000 bits. In some situations, such a large size makes the numbers too long to be practically useful.

One such situation is found in authentication, which can be required anywhere a party or a machine must prove that it is authorized to access or use a product or service. An example of such a situation is in a product ID system for a software program(s), where a user must hand-enter a product ID sequence stamped on the outside of the properly licensed software package as proof that the software has been properly paid for. If the product ID sequence is too long, then it will be cumbersome and user unfriendly.

Additionally, not only do software manufacturers lose revenue from unauthorized copies of their products, but software manufacturers also frequently provide customer support, of one form or another, for their products. In an effort to limit such support to their licensees, customer support staffs often require a user to first provide the product ID associated with his or her copy of the product for which support is sought as a condition for receiving support. Many current methods of generating product IDs, however, have been easily discerned by unauthorized users, allowing product IDs to be generated by unauthorized users.

Given the apparent ease with which unauthorized users can obtain valid indicia, software manufacturers are experiencing considerable difficulty in discriminating between licensees and such unauthorized users in order to provide support to the former while denying it to the latter. As a result, manufacturers often unwittingly provide support to unauthorized users, thus incurring additional and unnecessary support costs. If the number of unauthorized users of a software product is sufficiently large, then these excess costs associated with that product can be quite significant.

New curve-based cryptographic techniques have recently been employed to allow software manufacturers to appreciably reduce the incidence of unauthorized copying of software products. For example, product IDs have been generated using hyperelliptic curve cryptographic techniques. The resulting product IDs provide improved security. Curve-based cryptographic techniques may also be used to perform other types of cryptographic services.

As curve-based cryptosystems grow in popularity, it would be useful to have new and improved techniques for performing the computations associated with the requisite mathematical operations. Hence, there is a continuing need for improved mathematical and/or computational methods and apparati in curve-based cryptosystems.

SUMMARY

In accordance with certain exemplary aspects of the present invention, various methods and apparati are provided for use in curve-based cryptosystems.

By way of example, the above stated needs and others are addressed by a method that includes determining at least one Squared Tate pairing for at least one hyperelliptic curve, and cryptographically processing selected information based on the determined Squared Tate pairing.

In certain implementations, the method also includes determining a hyperelliptic curve C and forming a mathematical chain for m, wherein m is a positive integer and an m-torsion divisor D is fixed in the Jacobian of a hyperelliptic curve C. Here, the mathematical chain may include an addition chain, an addition-subtraction chain, etc.

Given a divisor D in the Jacobian J(C) of a hyperelliptic curve C over a field K, and two integers i and j, this method may further include determining a tuple $((i+j)D, f_{i+j,D})$ using $(iD, f_{i,D})$ and $(jD, f_{j,D})$, wherein iD, jD and $(i+j)D$ are multiples of divisor the D and $f_{i,D}$, $f_{j,D}$ and $f_{i+j,D}$ are rational functions defined on points on the curve C over the algebraic closure, and wherein the tuple $((i+j)D, f_{i+j,D})$ represents an iterative building block for progressing along the mathematical chain. The term "mathematical chain" as used herein is representative of an addition chain or an addition-subtraction chain. The tuple notation $((i+j)D, f_{i+j,D})$ may also be applicable to another divisor E as a second tuple $((i+j)E, f_{i+j,E})$.

If $f$ is a rational function defined at points P on the curve C over the algebraic closure, then one may extend the domain of $f$ to divisors on the Jacobian J of C by specifying (1) $f((P))= f(P)$ (i.e., the function's value at a divisor (P) is the same as its value at the point P); (2) linearity (additive on the left, multiplicative on the right): if $E_1$ and $E_2$ in J, then $f(E_1+E_2)=f(E_1)f(E_2)$ and $f(E_1-E_2)=f(E_1)/f(E_2)$. A consequence is, if $$E=n_1(P_1)+n_2(P_2)+\ldots+n_k(P_k)$$

for integers k, $n_1, n_2, \ldots, n_k$, and wherein $P_1, P_2, \ldots, P_k$ are points on C, then $$f(E) = f(P_1)^{n_1} f(P_2)^{n_2} \ldots f(P_k)^{n_k}.$$

The method may include determining $h_{i+j,D}$ given $h_{i,D}$ and $h_{j,D}$. Here, for example, $h_{j,D}(E)$ may take the form of $f_{i,D}((Q)-(-Q)) = f_{i,D}(Q)/f_{i,D}(-Q)$ wherein $-Q$ is the complement of Q: if $Q=(x, y)$, then $-Q=(x, -y)$.

The method in certain implementations further includes determining $h_{m,D}$ where the divisor D has order m in the Jacobian group J(C).

Another exemplary method includes determining a hyperelliptic curve C of genus g over a field K, determining a Jacobian J(C) of the hyperelliptic curve C, and wherein each element D of J(C) contains a representative of the form $A-g(P_0)$, where A is an effective divisor of degree g; determining a group of divisors $Div^0(C)$ of degree 0 on the hyperelliptic curve C, and determining a function $h_{j,D}$. Here, for example, in certain implementations, the hyperelliptic curve C of genus g is over a field K not of characteristic 2, and for at least one element D of J(C), a representative for iD (where i is an integer) will be $A_i - g(P_0)$, where $A_i$ is effective of degree g. Also, wherein if $P=(x, y)$ is a point on the hyperelliptic curve C, then $-P$, denotes a point $-P := (x, -y)$, and wherein if a point $P=(x, y)$ occurs in A and $y \neq 0$, then $-P := (x, -y)$ does not occur in A and wherein a representative for the group identity will be the divisor $(P_0)$ ($g(P_0)$ denotes g times the divisor $(P_0)$). This method may also include associating, to a representative $A_i$, two polynomials $(a_i, b_i)$ which represent a divisor, and determining D as an m-torsion element of J(C).

In certain further implementations the method includes if j is an integer, then $h_{j,D} = h_{j,D}(X)$ denoting a rational function on C with divisor $(h_{j,D}) = jA_1 - A_j - ((j-1)g)(P_0)$, and wherein D is an m-torsion divisor and $A_m = g(P_0)$, and a divisor of $h_{m,D}$ is $(h_{m,D}) = mA_1 - mg(P_0)$, and also wherein $h_{m,D}$ is well-defined up to a multiplicative constant. The method may also include evaluating $h_{m,D}$ at a degree zero divisor E on the hyperelliptic curve C, wherein E does not contain $P_0$ and E is prime to $A_i$ for all $i \leq m$.

The method may include determining a Squared Tate pairing $v_m(D,E)$ on a hyperelliptic curve C, for an m-torsion element D of a Jacobian J(C) and an element E of J(C), with representatives $(P_1)+(P_2)+ \ldots +(P_g)-g(P_0)$ and $(Q_1)+(Q_2)+ \ldots +(Q_g)-g(P_0)$, respectively, with each $P_i$ and each $Q_j$ on the curve C, with $P_i$ not equal to $\pm Q_j$ for all i,j, determining that $$v_m(D, E) := \left(h_{m,D}((Q_1) - (-Q_1) + (Q_2) - (-Q_2) + \ldots + (Q_g) - (-Q_g))\right)^{\frac{q-1}{m}}.$$

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Introduction

The discussions herein assume a basic understanding of cryptography by the reader. For a basic introduction of cryptography, the reader is directed to a book written by Bruce Schneier and entitled "Applied Cryptography: Protocols, Algorithms, and Source Code in C," published by John Wiley & Sons with copyright 1994 (or second edition with copyright 1996).

Described herein are techniques that can be used with a curve-based cryptosystem, and in particular elliptic curve-based cryptosystems. In certain examples, the techniques take the form of methods and apparati that can be implemented in logic within one or more devices. One such device, for example, is a computing device that is configured to perform at least a portion of the processing required for a particular cryptographic capability or application.

The techniques provided herein can be implemented and/or otherwise adapted for use in a variety of cryptographic capabilities and applications. By way of example, the techniques may be employed to support: key generation logic, e.g., for one-round three-way key establishment applications; identity-based encryption logic; short signature logic, e.g., product identifier logic; and/or other like cryptographic logic.

The term logic as used herein is meant to include any suitable form of logic that may be employed. Thus, for example, logic may include hardware, firmware, software, or any combination thereof.

The term curve-based cryptosystem as used herein refers to logic that at least partially provides for curve-based encryption and/or decryption using key(s) that are generated based at least partially on aspects or characteristics of an elliptic curve or other like curve.

Such curve-based cryptosystems can be used to encrypt any of a wide variety of information. Here, for example, one exemplary cryptosystem is described primarily with respect to generation of a short signature or product identifier, which is a code that allows validation and/or authentication of a machine, program, user, etc. The signature is a "short" signature in that it uses a relatively small number of characters.

Figure 1:
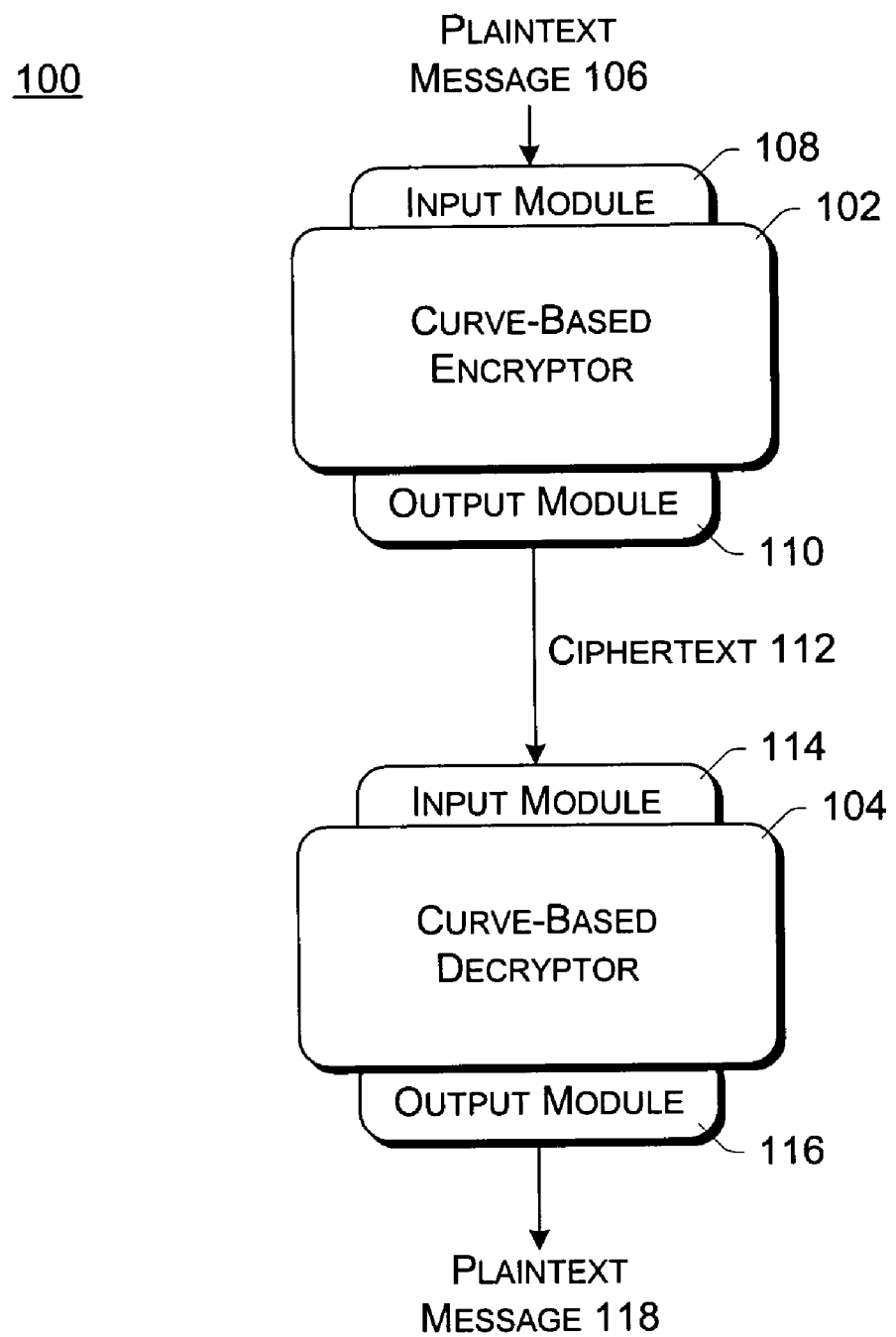
FIG. 1 is a block diagram illustrating an exemplary cryptosystem in accordance with certain implementations of the present invention.

With this in mind, attention is drawn to FIG. 1, which is a block diagram illustrating an exemplary cryptosystem 100 in accordance with certain implementations of the present invention. Cryptosystem 100 includes an encryptor 102 and a decryptor 104. A plaintext message 106 is received at an input module 108 of encryptor 102, which is a curve-based encryptor that encrypts message 106 based on a public key generated based on a secret known by decryptor 104. Plaintext message 106 is typically an unencrypted message, although encryptor 102 can encrypt any type of message/data. Thus, message 106 may alternatively be encrypted or encoded by some other component (not shown) or a user.

An output module 110 of encryptor 102 outputs the encrypted version of plaintext message 106, which is ciphertext 112. Ciphertext 112 can then be communicated to decryptor 104, which can be implemented, for example, on a computer system remote from a computer system on which encryptor 102 is implemented. Given the encrypted nature of ciphertext 112, the communication link between encryptor 102 and 104 need not be secure (it is typically presumed that the communication link is not secure). The communication link can be any of a wide variety of public and/or private networks implemented using any of a wide variety of conventional public and/or proprietary protocols, and including both wired and wireless implementations. Additionally, the communication link may include other non-computer network components, such as hand-delivery of media including ciphertext or other components of a product distribution chain.

Decryptor 104 receives ciphertext 112 at input module 114 and, being aware of the secret used to encrypt message 106, is able to readily decrypt ciphertext 112 to recover the original plaintext message 106, which is output by output module 116 as plaintext message 118. Decryptor 104 is a curve-based decryptor that decrypts the message based on the same curve as was used by encryptor 102.

Encryption and decryption are performed in cryptosystem 100 based on a secret, such as points on the hyperelliptic curve. This secret is known to decryptor 104, and a public key generated based on the secret is known to encryptor 102. This knowledge allows encryptor 102 to encrypt a plaintext message that can be decrypted only by decryptor 104. Other components, including encryptor 102, which do not have knowledge of the secret cannot decrypt the ciphertext (although decryption may be technically possible, it is not computationally feasible). Similarly, decryptor 104 can also generate a message using the secret and based on a plaintext message, a process referred to as digitally signing the plaintext message. This signed message can then be communicated to other components, such as encryptor 102, which can in turn verify the digital signature based on the public key.

Figure 2:
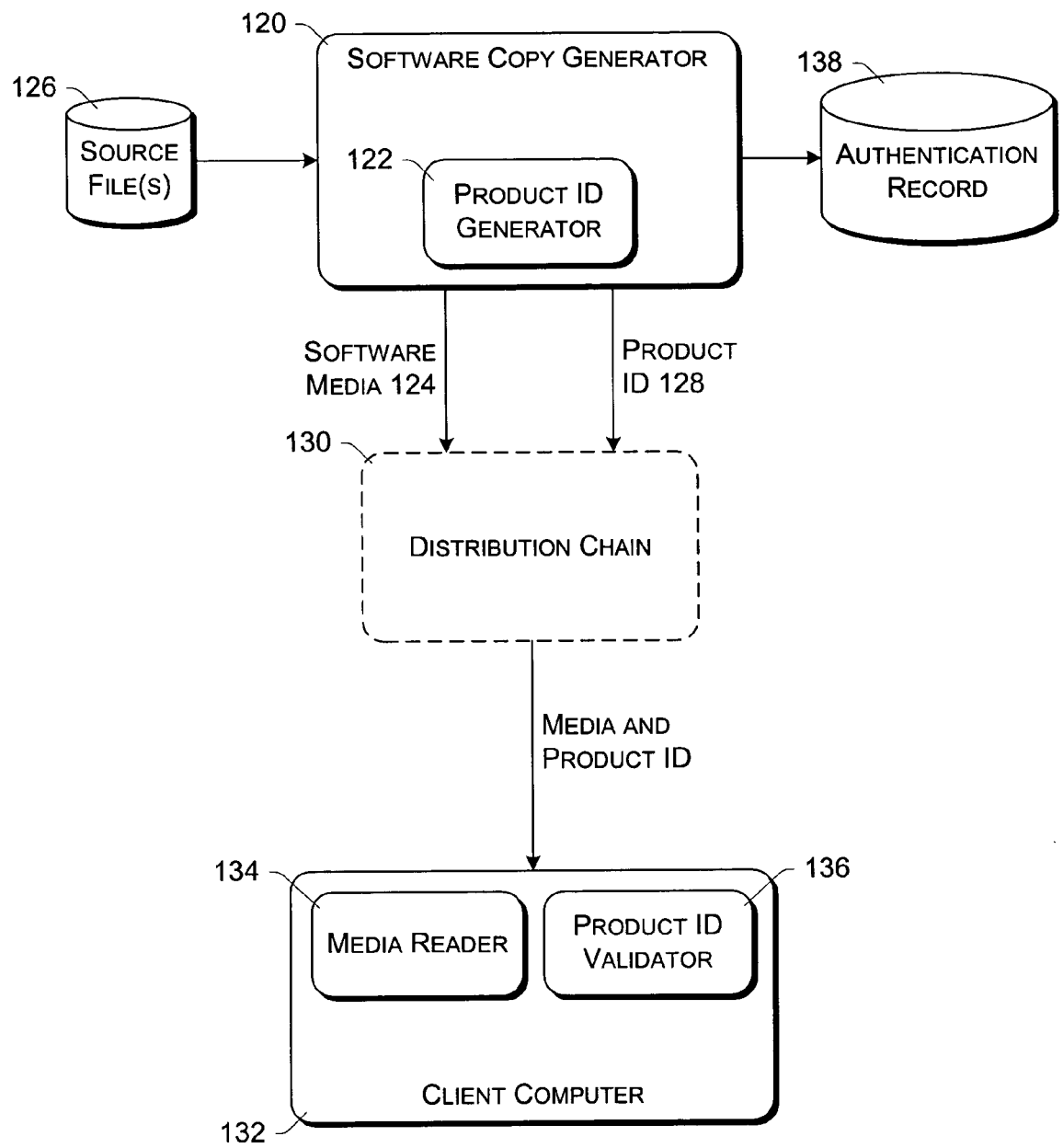
FIG. 2 illustrates an exemplary system using a product identifier to validate software in accordance with certain implementations of the present invention.

FIG. 2 illustrates an exemplary system using a product identifier to validate software in accordance with certain implementations of the present invention. FIG. 2 illustrates a software copy generator 120 including a product identifier (ID) generator 122. Software copy generator 120 produces software media 124 (e.g., a CD-ROM, DVD (Digital Versatile Disk)) that typically contains all the files needed to collectively implement a complete copy of one or more application programs, (e.g., a word processing program, a spreadsheet program, an operating system, a suite of programs). These files are received from source files 126, which may be a local source (e.g., a hard drive internal to generator 120), a remote source (e.g., coupled to generator 120 via a network), or a combination thereof. Although only a single generator 120 is illustrated in FIG. 2, typically multiple such generators operate individually and/or cooperatively to increase the rate at which software media 124 can be generated.

Product ID generator 122 generates a product ID 128 that can include numbers, letters, and/or other symbols. Generator 122 generates product ID 128 using the curve-based encryption techniques described herein. The product ID 128 is typically printed on a label and affixed to either a carrier containing software media 124 or a box into which software media 124 is placed. Alternatively, the product ID 128 may be made available electronically, such as a certificate provided to a user when receiving a softcopy of the application program via an on-line source (e.g., downloading of the software via the Internet). The product ID can serve multiple functions. First, the product ID can be cryptographically validated in order to verify that the product ID is a valid product ID (and thus allowing, for example, the application program to be installed). Additionally, the product ID can optionally serve to authenticate the particular software media 124 to which it is associated.

The generated software media 124 and associated product ID 128 are then provided to a distribution chain 130. Distribution chain 130 represents any of a variety of conventional distribution systems and methods, including possibly one or more "middlemen" (e.g., wholesalers, suppliers, distributors, retail stores (either on-line or brick and mortar)). Regardless of the manner in which media 124 and the associated product ID 128 are distributed, eventually media 124 and product ID 128 are purchased (e.g., licensed), by the user of a client computer 132.

Client computer 132 includes a media reader 134 capable of reading software media 124 and installing the application program onto client computer 132 (e.g., installing the application program on to a hard disk drive (not shown) of client computer 132). Part of this installation process involves entry of the product ID 128. This entry may be a manual entry (e.g., the user typing in the product ID via a keyboard), or alternatively an automatic entry (e.g., computer 132 automatically accessing a particular field of a license associated with the application program and extracting the product ID there from). Client computer 132 also includes a product ID validator 136 which validates, during installation of the application program, the product ID 128. This validation is performed using the curve-based decryption techniques.

If validator 136 determines that the product ID is valid, then an appropriate course of action is taken (e.g., an installation program on software media 124 allows the application to be installed on computer 132). However, if validator 136 determines that the product ID is invalid, then a different course of action is taken (e.g., the installation program terminates the installation process preventing the application program from being installed).

Product ID validator 136 also optionally authenticates the application program based on the product ID 128. This authentication verifies that the product ID 128 entered at computer 132 corresponds to the particular copy of the application being accessed. The authentication can be performed at different times, such as during installation, or when requesting product support or an upgrade. Alternatively, this authentication may be performed at a remote location (e.g., at a call center when the user of client computer 132 calls for technical support, the user may be required to provide the product ID 128 before receiving assistance).

If the application program manufacturer desires to utilize the authentication capabilities of the product ID, then the product ID generated by generator 122 for each copy of an application program should be unique. This uniqueness is created by assigning a different initial number or value to each copy of the application program. This initial value can then be used as a basis for generating the product ID.

The unique value associated with the copy of the application program can optionally be retained by the manufacturer as an authentication record 138 (e.g., a database or list) along with an indication of the particular copy of the application program. This indication can be, for example, a serial number embedded in the application program or on software media 124, and may be hidden in any of a wide variety of conventional manners.

Alternatively, the individual number itself may be a serial number that is associated with the particular copy, thereby allowing the manufacturer to verify the authenticity of an application program by extracting the initial value from the product ID and verifying that it is the same as the serial number embedded in the application program or software media 124.

Appropriate action can be taken based on whether the product ID is authenticated. These actions can vary, depending on the manufacturer's desires and/or action being taken at computer 132 that caused the authentication check to occur.

For example, if a user is attempting to install an application program then installation of the program may be allowed only if the authentication succeeds. By way of another example, the manufacturer's support technicians may provide assistance to a user of computer 132 only if the authentication succeeds, or an upgrade version of the application program may be installed only if authentication of the previous version of the application program succeeds.

The logic of certain curve-based cryptosystems utilizes what are commonly referred to as "Weil and Tate pairings" for cryptographic protocols when using elliptic or hyperelliptic curves. The Weil and Tate pairings have been proposed for use in many aspects of cryptography. They may be used, for example, to form efficient protocols to do one-round three-way key establishment, identity-based encryption, short signatures, and the like.

It is important, however, given the amount of processing to have efficient implementations of the Weil and Tate pairings to reduce the computing/resource costs associated of implementing these protocols.

Computation of the Weil or Tate pairing in conventional cryptosystems typically follows "Miller's algorithm", which is described, for example, in "Identity-Based Encryption From The Weil Pairing", by Dan Boneh and Matthew Franklin, published in SIAM J. of Computing, Vol. 32, No. 3, pp. 586-615, 2003.

As described in this article and as is well-known, for a fixed positive integer m, the Weil pairing $e_m$ is a bilinear map that takes as input two m-torsion points on an elliptic curve, and outputs an $m^{th}$ root of unity. For elliptic curves, as is well-known, the Tate pairing is related to the Weil pairing by the fact that the Weil pairing is a quotient of the output of two applications of the Tate pairing. The algorithms for these pairings construct rational functions with a prescribed pattern of poles and zeros.

The hyperelliptic analogue of the Miller algorithm, as could be implemented in conventional curve-based cryptosystems, would call for the evaluation of the Tate pairing by evaluating a function at two selected divisors on the curve, wherein one of the divisors is a "random" point selected using a randomly generated input. Unfortunately, there is a chance that the Miller algorithm would essentially fail with some random input values. If there is a failure of the Miller algorithm, then the logic will usually need to re-run the Miller algorithm using a different random input value. Although the failure rate of the Miller algorithm tends to be fairly low, if it is required to be run thousands or millions of times, eventually the processing delays may become significant. Also, if the processing is performed in a parallel processing environment, the timing of the processing may be slowed or delayed as some of the processing pipelines or the like are required to re-run the Miller algorithm.

The present invention describes a Squared Tate pairing on the Jacobian of hyperelliptic curves. The improved techniques described herein provide increased efficiency and an alternative method to the conventional method of implementing the Tate pairing for Jacobians of hyperelliptic curves. For example, in accordance with certain aspects of the present invention, the improved techniques do not require a randomly chosen m-torsion divisor as described above and as such under certain conditions always generate a correct answer.

With this exemplary improvement in mind, in the following sections an improved algorithm is described for computing what is hereby referred to as the "Squared Tate pairing for hyperelliptic curves", with a representative function of $v_m(D, E)$.

With the Squared Tate pairing for hyperelliptic curves, one may obtain a significant speed-up over a contemporary implementation of the Tate pairing for hyperelliptic curves. The Squared Tate pairing for hyperelliptic curves can be substituted for the Tate pairing for hyperelliptic curves in any of the above applications.

By way of further reference, other exemplary curve-based cryptosystems are provided in the following references: "Short Signatures from the Weil Pairing", by Dan Boneh, et al., in *Advances in Cryptography—Asiacrypt* 2001, Lecture Notes in Computer Science, Vol. 2248, Springer-Verlag, pp. 514-532; and, "The Weil and Tate Pairings as Building Blocks for Public Key Cryptosystems (Survey)", by Antoine Joux, in *Algorithmic Number Theory*, $5^{th}$ *International Symposium ANTS-V*, Sydney, Australia, July 2002 proceedings, Claus Fieker and David R. Kohel (Eds.), Lecture Notes in Computer Science, Vol. 2369, Springer-Verlag, pp. 20-32.

Figure 3:
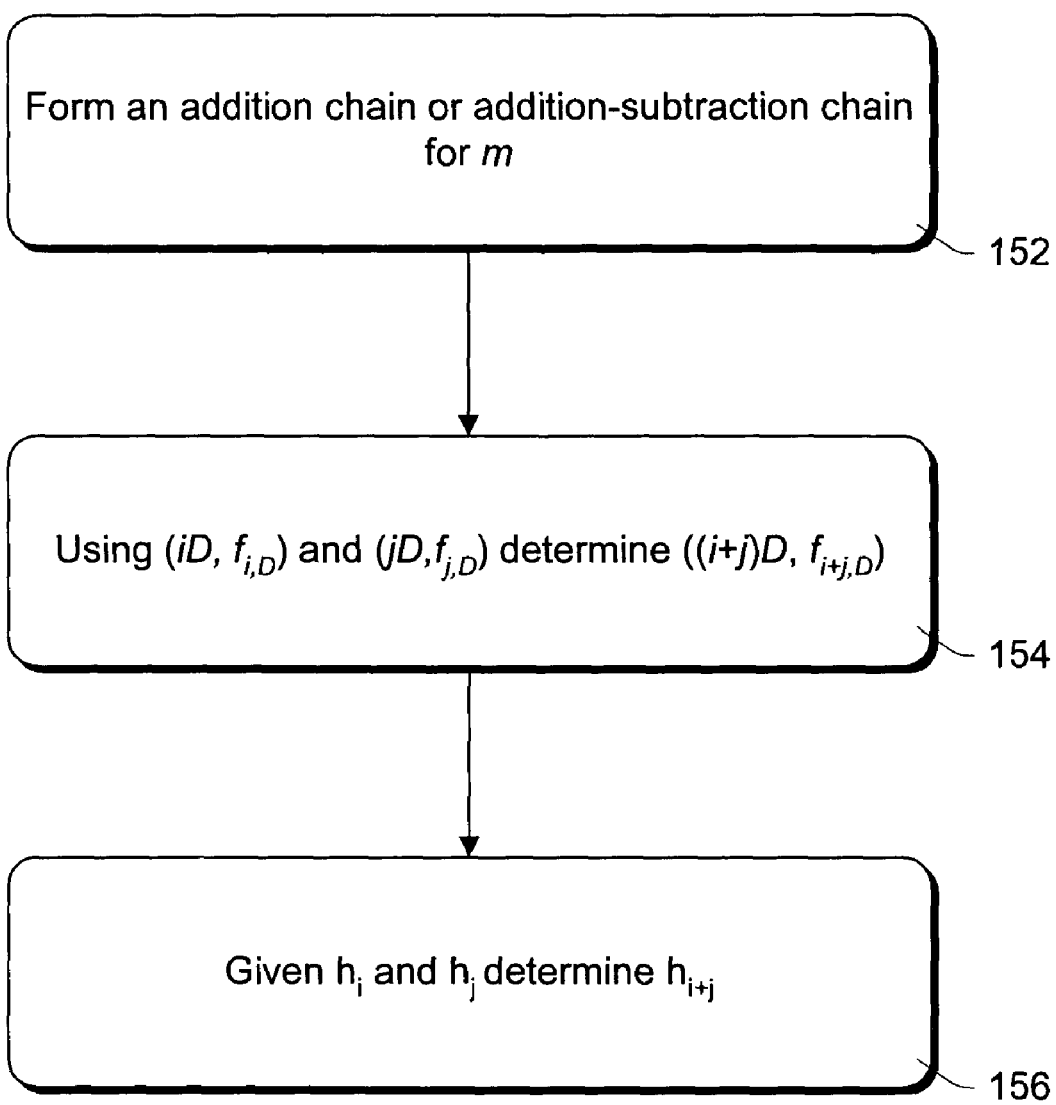
FIG. 3 illustrates an exemplary process for use in a curve-based cryptosystem in accordance with certain implementations of the present invention.

Attention is now drawn to FIG. 3, which is a flow diagram illustrating an exemplary process 150 for use in comparing the Tate pairings for hyperelliptic curves. In act 152, an addition chain, addition-subtraction chain, or the like, is formed for m, wherein m is a positive integer and an m-torsion divisor D is fixed on a hyperelliptic curve C. In act 154, the tuple $((i+j)D, f_{i+j,D})$ is determined using $(iD, f_{i,D})$ and $(jD, f_{j,D})$, wherein i and j are integers, iD, jD and (i+j)D are multiples of divisor D, and $f_{i,D}$ $f_{j,D}$ and $f_{i+j,D}$ are rational functions defined on the curve C, and $((i+j)D, f_{i+j,D})$ represents an iterative building block for progressing along an addition or addition-subtraction chain. With the Tate pairing, for example, $((i+j)D, f_{i+j,D})$ can also be run for another divisor E, e.g., $((i+j)E, f_{i+j,E})$. In act 156, $h_{i+j}$ is determined given $h_i$ and $h_j$, wherein $h_i$, $h_j$ and $h_{i+j}$ are field elements and for example, $$h_i := \frac{f_{i,D}(D_1)}{f_{i,D}(D_2)}$$

and $D_1$ and $D_2$ are certain elements of J and the goal is to compute $h_m$. In a conventional generalization of the Miller algorithm to hyperelliptic curves, $D_1$ and $D_2$ are random value inputs.

In certain improvements provided herein, for example, an improved algorithm essentially produces:

$$h'_i := \frac{f_{i,D}(D)}{f_{i,D}(D')}$$

wherein the D' is obtained from D by changing the sign of the y-coordinate of each point appearing in D.

In accordance with certain aspects of the present invention, an improvement is made to act 156 wherein Squared Tate pairing for hyperelliptic curves is introduced.

Squared Tate Pairing for Hyperelliptic Curves

The purpose of this section is to construct a new pairing, referred to as Squared Tate pairing, which has the advantage of being more efficient to compute. Let C: $y^2 = f(x)$ be a hyperelliptic curve of genus g over a field K not of characteristic 2.

For simplicity it is assumed that the degree of $f$ is odd so that C has one point at infinity $P_0$. The case where $f$ has even degree can be handled similarly.

The following notation will be used:

J(C) will denote the Jacobian of C.

$Div^0(C)$ will denote the group of divisors of degree 0 on C.

If $P=(x, y) \neq P_0$ is a point on C, then $-P$ will denote the point $-P := (x, -y)$. If $P=P_0$ then $-P=P_0$.

$x(X)$ and $y(X)$ are rational functions designating the x- and y-coordinates of the point X on C. $x(X)$ has a pole of order 2 at $X=P_0$ and $y(X)$ has a pole of order $2g+1$ at $X=P_0$. These satisfy $x(-X)=x(X)$ and $y(-X)=-y(X)$.

The Squared Tate pairing will be a function that takes as input an m-torsion element, D, of J(C) and an element E of J(C) and that outputs an element of the underlying field K.

The theorem of Riemann-Roch asserts that each element D of J(C) contains a representative of the form $A-g(P_0)$, where A is an effective divisor of degree g. One can always find a representative of this form and for hyperelliptic curves we can even impose the additional condition that if a point $P=(x, y)$ occurs in A and if y is not equal to 0, then $-P:=(x,-y)$ does not occur in A. The representative for the identity will be $A_0=g(P_0)$. For an element D of J(C) and an integer i, a representative for iD will be $A_i-g(P_0)$, where $A_i$ is effective of degree g with the properties as above.

To represent $A_i$ one can then associate two univariate polynomials $(a_i, b_i)$ over the field K which represent the divisor.

Constructing Function $h_{j,D}$:

Now let D be an m-torsion element of J(C). If j is an integer, then $h_{j,D} = h_{j,D}(X)$ denotes a rational function on C with divisor $(h_{j,D})=j(A_1-g(P_0))-(A_j-g(P_0))=jA_1-A_j-((j-1)g)(P_0)$ Since D is an m-torsion element, that means that $A_m=A_0=g(P_0)$, so the divisor of $h_{m,D}$ is $(h_{m,D})=mA_1-g(P_0)-((m-1)g)(P_0)=mA_1-mg(P_0)$.

Here, $h_{m,D}$ is well-defined up to a multiplicative constant. This constant disappears when one evaluates $h_{m,D}$ at a degree-zero divisor E on the curve (E is now a divisor on the curve C, not an elliptic curve):

Assume that the support of E does not contain $P_0$ and that E is prime to the $A_i$'s which were defined above, E only has to be prime to those representatives which will be used in the addition-subtraction chain for m, hence prime to about log m divisors.

Using Cantor's algorithm, given $A_i$, $A_j$, and $A_{i+j}$, one can determine a rational function $u_{i,j}$ such that the divisor of $u_{i,j}$ is equal to $(u_{i,j})=A_i+A_j-A_{i+j}-A_0=A_i+A_j-A_{i+j}-g(P_0)$.

Now $h_{j,D}(E)$ may be evaluated on C, for example, as follows:

When $j=1$, let $h_{j,D}$ be 1.

Suppose that one has $A_i$, $A_j$, $h_{i,D}(E)$ and $h_{j,D}(E)$. Let $u_{i,j}$ be the above function on C such that:

$(u_{i,j})=A_i+A_j-A_{i+j}-g(P_0)$.

Then $h_{i+j,D}(E)=h_{i,D}(E)h_{j,D}(E)u_{i,j}(E)$.

Defining the Squared Tate Pairing for Hyperelliptic Curves $v_m$:

Given an m-torsion element D of J(C) and an element E of J(C), with representatives $(P_1)+(P_2)+\ldots+(P_g)-g(P_0)$ and $(Q_1)+(Q_2)+\ldots+(Q_g)-g(P_0)$, respectively, with all $P_i$ and $Q_j$ on C and with $P_i$ not equal to $\pm Q_j$ for all i,j define $v_m(D, E) := (h_{m,D}((Q_1)-(-Q_1)+(Q_2)-(-Q_2)+\ldots+$ -continued $(Q_g)-(-Q_g)))^{\frac{q-1}{m}}$ $= \frac{h_{m,D}(Q_1) * h_{m,D}(Q_2) * \ldots * h_{m,D}(Q_g)}{h_{m,D}(-Q_1) * h_{m,D}(-Q_2) * \ldots * h_{m,D}(-Q_g)}.$ As used herein, a dark – signifies negation of the y-coordinate of a point on C, whereas the lighter +'s and –'s signify addition and subtraction in the formal group of divisors.

An Exemplary Algorithm to Compute $v_m(D,E)$:

Assume for simplicity that $g=2$. Let D and E be as above. Form an addition-subtraction chain for m. For each j in the addition-subtraction chain we want a tuple $t_j=[A_j, n_j, d_j]$ such that the divisor jD has a representative $A_j-2(P_0)$ and $$\frac{n_j}{d_j} = \frac{h_{j,D}(Q_1) * h_{j,D}(Q_2)}{h_{j,D}(-Q_1) * h_{j,D}(-Q_2)}.$$

We are interested in the final quotient $n_m/d_m$, but in practice it is more efficient to evaluate the intermediate outputs $n_j$ and $d_j$, keeping track of the numerators and denominators separately, and to combine them together in the end. This is just one option for evaluating the pairing and is not intended to be limiting. We can start with $t_0=[A_0, n_0, d_0]$ and $t_1=[A_1, n_1, d_1]$ where $A_0=2(P_0)$ and $A_1=(Q_1)+(Q_2)$ and $n_0=d_0=n_1=d_1=1$, with $h_{0,D}(X)=h_{1,D}(X)=1$ (constant).

Given $t_i$ and $t_j$, let $(a_i, b_i)$ and $(a_j, b_j)$ be the polynomials corresponding to the divisors $A_i$ and $A_j$. More precisely, each first polynomial $a_i(x)$ is monic and its zeros are the x-coordinates of the points in the support of the divisor $A_i$ (in the algebraic closure of the field K). Each second polynomial $b_i(x)$ has degree less than the degree of $a_i(x)$. The parametric curve $(a_i(x), b_i(x))$ has the property that it passes through the finite points in the support of the divisor $A_i$. Do a composition step as, for example, in Cantor's algorithm to obtain $(a_{new}, b_{new})$ corresponding to $A_i+A_j$ without performing the reduction step. Let $d(x)$ be the greatest common divisor of the three polynomials $(a_i(x), a_j(x), b_i(x)+b_j(x))$ as in Cantor. The polynomial $d(x)$ depends on i and j, but we will omit the subscripts here for ease of notation. If $d(x)=1$, then $a_{new}(x)$ is just the product of $a_i(x)$ and $a_j(x)$, and $b_{new}(X)$ is the cubic polynomial passing through the four distinct finite points in the support of $A_i$ and $A_j$.

The output polynomials satisfy $b_{new}(x)^2 \equiv f(x) \pmod{a_{new}(x)}$

If the degree of $a_{new}$ is greater than 2, Cantor's algorithm performs a reduction step and we can let $$u_{i,j}(X) := \frac{a_{new}(x(X))}{b_{new}(x(X))+y(X)} * d(x(X)).$$

Then $(u_{i,j}) = A_i + A_j - A_{i+j} - 2(P_0)$ and $$\frac{u_{i,j}(X)}{u_{i,j}(-X)} := \frac{a_{new}(x(X))}{a_{new}(x(-X))} * \frac{b_{new}((x(-X))+y(-X))}{b_{new}((x(X))+y(X))}$$

$$= \frac{b_{new}((x(X))-y(X))}{b_{new}((x(X))+y(X))}$$

Let $n_{i+j} := n_i n_j (b_{new}(x(Q_1)) - y(Q_1))(b_{new}(x(Q_2)) - y(Q_2))$.

Let $d_{i+j}:=d_id_j(b_{new}(x(Q_1))+y(Q_1))(b_{new}(x(Q_2))+y(Q_2))$.

One observes that there is no contribution from $a_{new}$ in $n_{i+j}$ and $d_{i+j}$ because the contributions from $x(Q_i)$ and $x(-Q_i)$ are equal (i=1, 2). If on the other hand the degree of $a_{new}$ is less than or equal to 2, then one can let $$u_{i,j}(X)=d(x(X))$$

Note that if we evaluate at intermediate steps then it is not enough to assume that the divisors D and E are coprime. Instead, E must also be coprime to $A_i$ for all i which occur in the addition chain for m. One way to ensure this condition is to require that E and D be linearly independent and that the polynomial a(x) in the pair (a(x), b(x)) representing E be irreducible. There are other ways possible to achieve this, like changing the addition chain for m.

The above techniques represent significant improvements over conventional algorithms for the Tate pairing.

Figure 4:
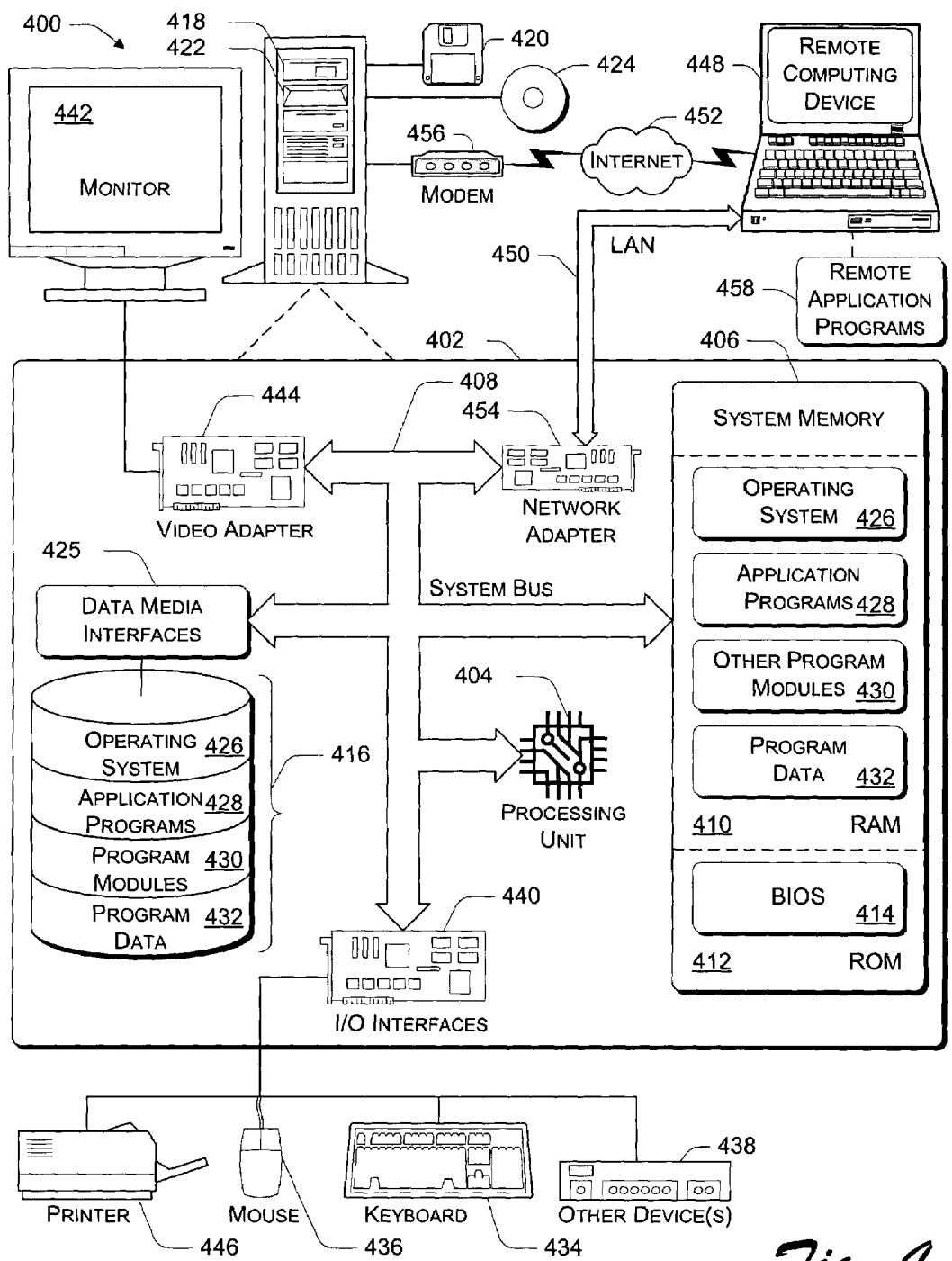
FIG. 4 illustrates a more general exemplary computer environment which can be used in various implementations of the invention.

FIG. 4 illustrates a more general exemplary computer environment 400, which can be used in various implementations of the invention. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can implement, for example, encryptor 102 or decryptor 104 of FIG. 1, generator 120 or client computer 132 of FIG. 2, either or both of modules 152 and 153 of FIG. 3, and so forth. Computer 402 represents any of a wide variety of computing devices, such as a personal computer, server computer, hand-held or laptop device, multiprocessor system, microprocessor-based system, programmable consumer electronics (e.g., digital video recorders), gaming console, cellular telephone, network PC, minicomputer, mainframe computer, distributed computing environment that include any of the above systems or devices, and the like.

The components of computer 402 can include, but are not limited to, one or more processors or processing units 404, a system memory 406, and a system bus 408 that couples various system components including the processor 404 to the system memory 406. The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that are accessible by computer 402 and include both volatile and non-volatile media, removable and non-removable media.

The system memory 406 includes computer readable media in the form of volatile memory, such as random access memory (RAM) 410, and/or non-volatile memory, such as read-only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 425. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Computer 402 typically includes at least some form of computer readable media. Computer readable media can be any available media that can be accessed by computer 402. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 402. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as wired network or direct-wired connection, and wireless media such as acoustic, RF, infrared and other wireless media. Combinations of any of the above should also be included within the scope of computer readable media.

The invention has been described herein in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various implementations.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, smartcard, and/or firmware. For example, one or more application specific integrated circuits (ASICs) could be designed or programmed to carry out the invention.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A method comprising:
   determining at least one Squared Tate pairing for at least one hyperelliptic curve;
   wherein determining the Squared Tate pairing further includes:
   forming a mathematical chain for m, wherein m is a positive integer and an m-torsion element D is fixed on Jacobian of the hyperelliptic curve C;
   wherein the mathematical chain includes a mathematical chain selected from a group of mathematical chains comprising an addition chain and an addition-subtraction chain;
   cryptographically processing selected information based on the determined Squared Tate pairing;
   outputting validation of selected information based on the determined Squared Tate pairing; and
   determining a course of action in response to validation of selected information.

2. The method as recited in claim 1, wherein the Squared Tate pairing is defined for at least one hyperelliptic curve C of genus g over a field K.

3. A computer storage medium having computer-implementable instructions for causing at least one processing unit to perform acts comprising:
   calculating at least one Squared Tate pairing for at least one hyperelliptic curve;
   wherein determining the Squared Tate pairing further includes:
   forming a mathematical chain for m, wherein m is a positive integer and an m-torsion element D is fixed on Jacobian of the hyperelliptic curve C;
   wherein the mathematical chain includes a mathematical chain selected from a group of mathematical chains comprising an addition chain and an addition-subtraction chain;
   cryptographically processing selected information based on the determined Squared Tate pairing;
   outputting validation of selected information based on the determined Squared Tate pairing; and
   determining a course of action in response to validation of selected information.

4. The computer storage medium as recited in claim 3, wherein the Squared Tate pairing is defined for at least one hyperelliptic curve C of genus g over a field K.

5. An apparatus comprising;
   memory configured to store information suitable for use with using a cryptographic process,
   logic operatively coupled to the memory and configured to calculate at least one Squared Tate pairing for at least one hyperelliptic curve, and at least partially support cryptographic processing of selected stored information based on the determined Squared Tate pairing;
   wherein the logic is further configured to form a mathematical chain for m, wherein m is a positive integer and an m-torsion element D is fixed on Jacobian of the hyperelliptic curve C;
   wherein the mathematical chain includes a mathematical chain selected from a group of mathematical chains comprising an addition chain and an addition-subtraction chain;
   determining a hyperelliptic curve C of genus g over a field K, determining a Jacobian J(C) of the hyperelliptic curve C;
   a display device coupled to the logic for outputting validation of selected information; and
   the logic determining a course of action in response to validation.

6. The apparatus as recited in claim 5, wherein the Squared Tate pairing is defined for at least one hyperelliptic curve C of genus g over a field K.

7. A method comprising:
   determining a hyperelliptic curve C of genus g over a field K and a positive integer m;
   determining a Jacobian J(C) of the hyperelliptic curve C, and wherein each element D of J(C) contains a representative of the form $A-g(P_0)$, where A is an effective divisor of degree g;
   determining a plurality of functions $h_{j,D}$ that are iterative building blocks for the formation of a function $h_{m,D}$ in order to evaluate $v_m$ which is a Squared Tate pairing;
   outputting validation of selected information based on the Squared Tate pairing; and
   determining a course of action in response to validation of selected information;
   wherein if P=(x, y) is a point on the hyperelliptic curve C, then −P denotes a point $-P:=(x, -y)$, and wherein if a point P=(x, y) occurs in A and y≠0, then $-P:=(x, -y)$ does not occur in A and a representative for identity will be $g(P_0)$.

8. The method as recited in claim 7, wherein the hyperelliptic curve C is over a field not of characteristic 2.

9. The method as recited in claim 7, wherein
   for at least one element D of J(C), a representative for iD will be $A_i-g(P_0)$, where $A_i$ is effective of degree g.

10. The method as recited in claim 9, further comprising: to a representative $A_i$, associating two polynomials $(a_i, b_i)$ which represent a divisor.

11. The method as recited in claim 9, further comprising: determining D as an m-torsion element of J(C).

12. The method as recited in claim 11, further comprising:
   if j is an integer, then $h_{j,D}=h_{j,D}(X)$ denoting a rational function on C with divisor $(h_{j,D})=jA_1-A_j-((j-1)g)(P_0)$.

13. The method as recited in claim 11, wherein D is an m-torsion divisor and $A_m=g(P_0)$, and a divisor of $h_{m,D}$ is $(h_{m,D})=mA_1-mg(P_0)$.

14. The method as recited in claim 11, wherein $h_{m,D}$ is well-defined up to a multiplicative constant.

15. The method as recited in claim 11, further comprising:
   evaluating $h_{m,D}$ at a degree zero divisor E on the hyperelliptic curve C, wherein E does not contain $P_0$ and E is prime to $A_i$.

16. The method as recited in claim 15, wherein given $A_i$, $A_j$, and $A_{i+j}$, further comprising determining a function $u_{i,j}$ such that a divisor of $u_{i,j}$ is $(u_{i,j})=A_i+A_j-A_{i+j}-g(P_0)$.

17. The method as recited in claim 15, further comprising; evaluating $h_{j,D}(E)$ such that when j=1, $h_{1,D}$ is 1.

18. The method as recited in claim 15, further comprising:
   given $A_i$, $A_j$, $h_{i,D}(E)$ and $h_{j,D}(E)$, evaluating $u_{i,j}$ to be $(u_{i,j})=A_i+A_j-A_{i+j}-g(P_0)$, and $h_{i+j,D}(E)=h_{i,D}(E) h_{j,D}(E) u_{i,j}(E)$.

19. The method as recited in claim 11, wherein E is prime to $A_i$ for all i in an addition-subtraction chain for m.

20. The method as recited in claim 7, further comprising: determining a function $(u_{i,j})=A_i+A_j-A_{i+j}-g(P_0)$.

21. The method as recited in claim 20, wherein g=2 and $(u_{i,j})=A_i+A_j-A_{i+j}-2(P_0)$ is determined as follows $$u_{i,j}(X) := \frac{a_{new}(x(X))}{b_{new}(x(X))+y(X)} * d(x(X)),$$

if the degree of $a_{new}$ is
   greater than 2, otherwise, $u_{i,j}$ is determined as $u_{i,j}(X):=d(x(X))$, wherein d(x) is the greatest common divisor of three polynomials $(a_i(x), a_j(x), b_i(x)+b_j(x))$.

22. The method as recited in claim 7, further comprising:
   determining a Squared Tate pairing for a hyperelliptic curves $v_m$, for an m-torsion element D of a Jacobian J(C) and an element E of J(C), with representatives $(P_1)+(P_2)+\ldots+(Pg)-g(P_0)$ and $(Q_1)+(Q_2)+\ldots+(Q_g)-g(P_0)$, respectively, with each $P_i$ and each $Q_j$ on the curve C, with $P_i$ not equal to $\pm Q_j$ for all i,j, determining that $$v_m(D, E) := \left(h_{m,D}((Q_1)-(-Q_1)+(Q_2)-(-Q_2)+\ldots+(Q_g)-(-Q_g))\right)^{\frac{q-1}{m}}.$$

23. A computer storage medium having computer-implementable instructions for causing at least one processing unit to perform acts comprising:
   determining a hyperelliptic curve C of genus g over a field K and a positive integer m;
   determining a Jacobian J(C) of the hyperelliptic curve C, and wherein each element D of J(C) contains a representative of the form $A-g(P_0)$, where A is an effective divisor of degree g; and
   determining a plurality of functions $h_{j,D}$ that are iterative building blocks for the formation of a function $h_{m,D}$ in order to evaluate $v_m$ which is a Squared Tate pairing;
   outputting validation of selected information based on the Squared Tate pairing; and
   determining a course of action in response to validation of selected information;
   wherein if P=(x, y) is a point on the hyperelliptic curve C, then −P denotes a point $-P:=(x, -y)$, and wherein if a point P=(x, y) occurs in A and y≠0, then $-P:=(x, -y)$ does not occur in A and a representative for identity will be $g(P_0)$.

24. The computer storage medium as recited in claim 23, wherein the hyperelliptic curve C is not of characteristic 2.

25. The computer storage medium as recited in claim 23, wherein for at least one element D of J(C), a representative for iD will be $A_i-g(P_0)$, where $A_i$ is effective of degree g.

26. The computer storage medium as recited in claim 25, further comprising:
    to a representative $A_i$, associating two polynomials $(a_i, b_i)$ which represent a divisor.

27. The computer storage medium as recited in claim 25, further comprising:
    determining D as an m-torsion element of J(C).

28. The computer storage medium as recited in claim 27, further comprising:
    if j is an integer, then $h_{j,D}=h_{j,D}(X)$ denoting a rational function on C with divisor $(h_{j,D})=jA_1-A_j-((j-1)g)(P_0)$.

29. The computer storage medium as recited in claim 27, wherein D is an m-torsion divisor and $A_m=g(P_0)$, and a divisor of $h_{m,D}$ is $(h_{m,D})=mA_1-mg(P_0)$.

30. The computer storage medium as recited in claim 27, wherein $h_{m,D}$ is well-defined up to a multiplicative constant.

31. The computer storage medium as recited in claim 27, further comprising:
    evaluating $h_{m,D}$ at a degree zero divisor E on the hyperelliptic curve C, wherein E does not contain $P_0$ and E is prime to $A_i$.

32. The computer storage medium as recited in claim 31, wherein given $A_i$, $A_j$, and $A_{i+j}$, further comprising determining a function $u_{i,j}$ such that a divisor of $u_{i,j}$ is $(u_{i,j=Ai}+A_j-A_{i+j}-g(P_0))$.

33. The computer storage medium as recited in claim 31, further comprising:
    evaluating $h_{j,D}(E)$ such that when j=1, $h_{1,D}$ is 1.

34. The computer storage medium as recited in claim 31, further comprising:
    given $A_i$, $A_j$, $h_{i,D}(E)$ and $h_{j,D}(E)$, evaluating $u_{i,j}$ to be $(u_{i,j})=A_i+A_j-A_{i+j}-g(P_0)$, and $h_{i+j,D}(E)=h_{i,D}(E)\ h_{j,D}(E)\ u_{i,j}(E)$.

35. The computer storage medium as recited in claim 27, wherein E is prime to $A_i$ for all i in an addition-subtraction chain for m.

36. The computer storage medium as recited in claim 23, further comprising:
    determining a function $(u_{i,j})=A_i+A_j-A_{i+j}-g(P_0)$.

37. The computer storage medium as recited in claim 36, wherein g=2 and
    $(u_{i,j})=A_i+A_j-A_{i+j}-2(P_0)$ is determined as follows $$u_{i,j}(X) := \frac{a_{new}(x(X))}{b_{new}(x(X))+y(X)} * d(x(X)),$$

if the degree of $a_{new}$ is
    greater than 2, otherwise, $u_{i,j}$ is determined as $u_{i,j}(X):=d(x(X))$, wherein d(x) is the greatest common divisor of three polynomials $(a_i(x), a_j(x), b_i(x)+b_j(x))$.

38. The computer storage medium as recited in claim 23, further comprising:
    determining a Squared Tate pairing for a hyperelliptic curves $v_m$, for an m-torsion element D of a Jacobian J(C) and an element E of J(C), with representatives $(P_1)+(P_2)+\ldots+(P_g)-g(P_0)$ and $(Q_1)+(Q_2)+\ldots+(Q_g)-g(P_0)$, respectively, with each $P_i$ and each $Q_j$ on the curve C, with $P_i$ not equal to $\pm Q_j$ for all i,j, determining that $$v_m(D, E) := \left(h_{m,D}((Q_1)-(-Q_1)+(Q_2)-(-Q_2)+\ldots+(Q_g)-(-Q_g)\right)^{\frac{q-1}{m}}.$$

39. An apparatus comprising:
    memory configured to store information suitable for use with using a cryptographic process; and
    logic operatively coupled to the memory and configured to determine a hyperelliptic curve C of genus g over a field K and a positive integer m, determine a Jacobian J(C) of the hyperelliptic curve C, wherein each element D of J(C) contains a representative of the form $A-g(P_0)$ and A is an effective divisor of degree g, and determine a plurality of functions $h_{j,D}$ that are iterative building blocks for the formation of a function $h_{m,D}$ in order to evaluate $v_m$ which is a Squared Tate pairing;
    a display device coupled to the logic for outputting validation of selected information; and
    the logic determining a course of action in response to the validation;
    wherein if P=(x, y) is a point on the hyperelliptic curve C, then –P denotes a point –P:=(x, –y), and wherein if a point P=(x, y) occurs in A and y≠0, then –P:=(x, –y) does not occur in A and a representative for identity will be $g(P_0)$.

40. The apparatus as recited in claim 39, wherein the hyperelliptic curve C is not of characteristic 2.

41. The apparatus as recited in claim 39, wherein
    for at least one element D of J(C), a representative for iD will be $A_i-g(P_0)$, where $A_i$ is effective of degree g.

42. The apparatus as recited in claim 41, wherein the logic is further configured to, for a representative $A_i$, associate two polynomials $(a_i, b_i)$ which represent a divisor.

43. The apparatus as recited in claim 41, wherein the logic is further configured to determine D as an m-torsion element of J(C).

44. The apparatus as recited in claim 43, wherein the logic is further configured to, if j is an integer, then determine $h_{j,D}=h_{j,D}(X)$ by denoting a rational function on C with divisor $(h_{j,D})=jA_1-A_j-((j-1)g)(P_0)$.

45. The apparatus as recited in claim 43, wherein D is an m-torsion divisor and $A_m=g(P_0)$, and a divisor of $h_{m,D}$ is $(h_{m,D})=mA_1-mg(P_0)$.

46. The apparatus as recited in claim 43, wherein $h_{m,D}$ is well-defined up to a multiplicative constant.

47. The apparatus as recited in claim 43, wherein the logic is further configured to evaluate $h_{m,D}$ at a degree zero divisor E on the hyperelliptic curve C, wherein E does not contain $P_0$ and E is prime to $A_i$.

48. The apparatus as recited in claim 47, wherein given $A_i$, $A_j$, and $A_{i+j}$, and wherein the logic is further configured to determine a function $u_{i,j}$ such that a divisor of $u_{i,j}$ is $(u_{i,j})=A_i+A_j-A_{i+j}-g(P_0)$.

49. The apparatus as recited in claim 47, wherein the logic is further configured to evaluate $h_{j,D}(E)$ such that when j=1, $h_{1,D}$ is 1.

50. The apparatus as recited in claim 47, wherein the logic is further configured to, given $A_i$, $A_j$, $h_{i,D}(E)$ and $h_{j,D}(E)$, evaluate $u_{i,j}$ to be $(u_{i,j})=A_i+A_j-A_{i+j}-g(P_0)$, and $h_{i+j,D}(E)=h_{i,D}(E)\ h_{j,D}(E)\ U_{i,j}(E)$.

51. The apparatus as recited in claim 43, wherein E is prime to $A_i$ for all i in an addition-subtraction chain for m.

52. The apparatus as recited in claim 39, wherein the logic is further configured to determine a function $(u_{i,j})=A_i+A_j-A_{i+j}-g(P_0)$.

53. The apparatus as recited in claim 52, wherein g=2 and $(u_{i,j})=A_i+A_j-A_{i+j}-2(P_0)$ is determined by the logic as follows $$u_{i,j}(X) := \frac{a_{new}(x(X))}{b_{new}(x(X)) + y(X)} * d(x(X)),$$

if the degree of $a_{new}$ is
greater than 2, otherwise, $u_{i,j}$ is determined as $u_{i,j}(X):=d(x(X))$, wherein $d(x)$ is the greatest common divisor of three polynomials $(a_i(x), a_j(X), b_i(x)+b_j(x))$.

54. The apparatus as recited in claim 39, wherein the logic is further configured to determine a Squared Tate pairing for a hyperelliptic curves $v_m$, for an m-torsion element D of a Jacobian J(C) and an element E of J(C), with representatives $(P_1)+(P_2)+\ldots+(P_g)-g(P_0)$ and $(Q_1)+(Q_2)+\ldots+(Q_g)-g(P_0)$, respectively, with each $P_i$ and each $Q_j$ on the curve C, with $P_i$ not equal to $\pm Q_j$ for all i, j, and to determine that $$v_m(D, E) := (h_{m,D}((Q_1)-(-Q_1)+(Q_2)-(-Q_2)+\ldots+(Q_g)-(-Q_g)))^{\frac{q-1}{m}}.$$

* * * * *

UNITED STATES PATENT AND TRADEMARK OFFICE
CERTIFICATE OF CORRECTION

PATENT NO.         : 7,440,569 B2
APPLICATION NO.    : 10/628729
DATED              : October 21, 2008
INVENTOR(S)        : Anne Kirsten Eisentraeger et al.

It is certified that error appears in the above-identified patent and that said Letters Patent is hereby corrected as shown below:

In column 15, line 1, in Claim 5, delete "comprising;" and insert -- comprising: --, therefor.

In column 15, line 3, in Claim 5, delete "process," and insert -- process; --, therefor.

In column 16, line 4, in Claim 17, delete "comprising;" and insert -- comprising: --, therefor.

In column 16, line 51, in Claim 23, delete "arc" and insert -- are --, therefor.

In column 18, line 62, in Claim 50, delete " $U_{i,j}(E)$, " and insert -- $u_{i,j}(E)$ --, therefor.

In column 19, line 13, in Claim 53, delete " $(a_i(x), a_j(X), b_i(x)+b_j(x))$ " and insert -- $(a_i(x), a_j(x), b_i(x)+b_j(x))$ --, therefor.

Signed and Sealed this
Third Day of May, 2011

David J. Kappos
*Director of the United States Patent and Trademark Office*